United States Patent
Kraeuter

(10) Patent No.: US 9,180,787 B2
(45) Date of Patent: Nov. 10, 2015

(54) VEHICLE HAVING A BATTERY-POWERED DRIVE ASSEMBLY WITH A CENTRAL LOCKING SYSTEM

(71) Applicant: AUDI AG, Ingolstadt (DE)

(72) Inventor: Thomas Kraeuter, Gaimersheim (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 14/368,385

(22) PCT Filed: Dec. 12, 2012

(86) PCT No.: PCT/EP2012/005115
§ 371 (c)(1),
(2) Date: Jun. 24, 2014

(87) PCT Pub. No.: WO2013/091793
PCT Pub. Date: Jun. 27, 2013

(65) Prior Publication Data
US 2014/0354230 A1  Dec. 4, 2014

(30) Foreign Application Priority Data

Dec. 24, 2011  (DE) .......................... 10 2011 122 216

(51) Int. Cl.
*H02J 7/00* (2006.01)
*B60L 11/18* (2006.01)
*H01R 13/447* (2006.01)
*H01R 13/639* (2006.01)

(52) U.S. Cl.
CPC ......... *B60L 11/1846* (2013.01); *B60L 11/1818* (2013.01); *B60L 2270/32* (2013.01); *B60L 2270/34* (2013.01); *H01R 13/447* (2013.01); *H01R 13/6397* (2013.01); *Y02T 10/7005* (2013.01); *Y02T 90/14* (2013.01)

(58) Field of Classification Search
CPC ........................... Y01T 90/14; F02N 2300/304
USPC ............................... 701/22; 439/133; 320/109
See application file for complete search history.

(56) References Cited

U.S. PATENT DOCUMENTS

| | | | |
|---|---|---|---|
| 2009/0082916 A1* | 3/2009 | Tanaka ........................... | 701/22 |
| 2011/0022256 A1 | 1/2011 | Asada et al. | |
| 2011/0300728 A1* | 12/2011 | Katagiri et al. ............... | 439/147 |

FOREIGN PATENT DOCUMENTS

| | | |
|---|---|---|
| DE | 10 2008 048 310 A1 | 4/2009 |
| DE | 20 2011 050 412 U1 | 10/2011 |

OTHER PUBLICATIONS

German Office Action issued Sep. 24, 2012 in corresponding German Patent Application No. 10 2011 122 216.6, 5 pages.
English translation of International Search Report mailed Aug. 9, 2013 in corresponding International Patent Application No. PCT/EP2012/005115, 2 pages.

(Continued)

*Primary Examiner* — Drew A Dunn
*Assistant Examiner* — Zixuan Zhou
(74) *Attorney, Agent, or Firm* — Staas & Halsey LLP

(57) ABSTRACT

In a vehicle having a battery-powered drive assembly, the charging socket for recharging the battery can be closed by a flap connected to the central locking system of the vehicle. When the charging plug is removed from the charging socket, the lock of the flap is temporarily opened by the control device of the central locking system, such that said flap can be moved into the lockable closed position and is then locked automatically.

12 Claims, 1 Drawing Sheet

(56) References Cited

OTHER PUBLICATIONS

PCT/EP2012/005115, Dec. 12, 2012, Thomas Kraeuter, Audi AG.
DE 10 2011 122 216.6, Dec. 24, 2011, Thomas Kraeuter, Audi AG.

WIPO English language translation of International Preliminary Report on Patentability, downloaded from WIPO website on Jul. 10, 2014, for corresponding International Patent Application No. PCT/EP2012/005115.

* cited by examiner

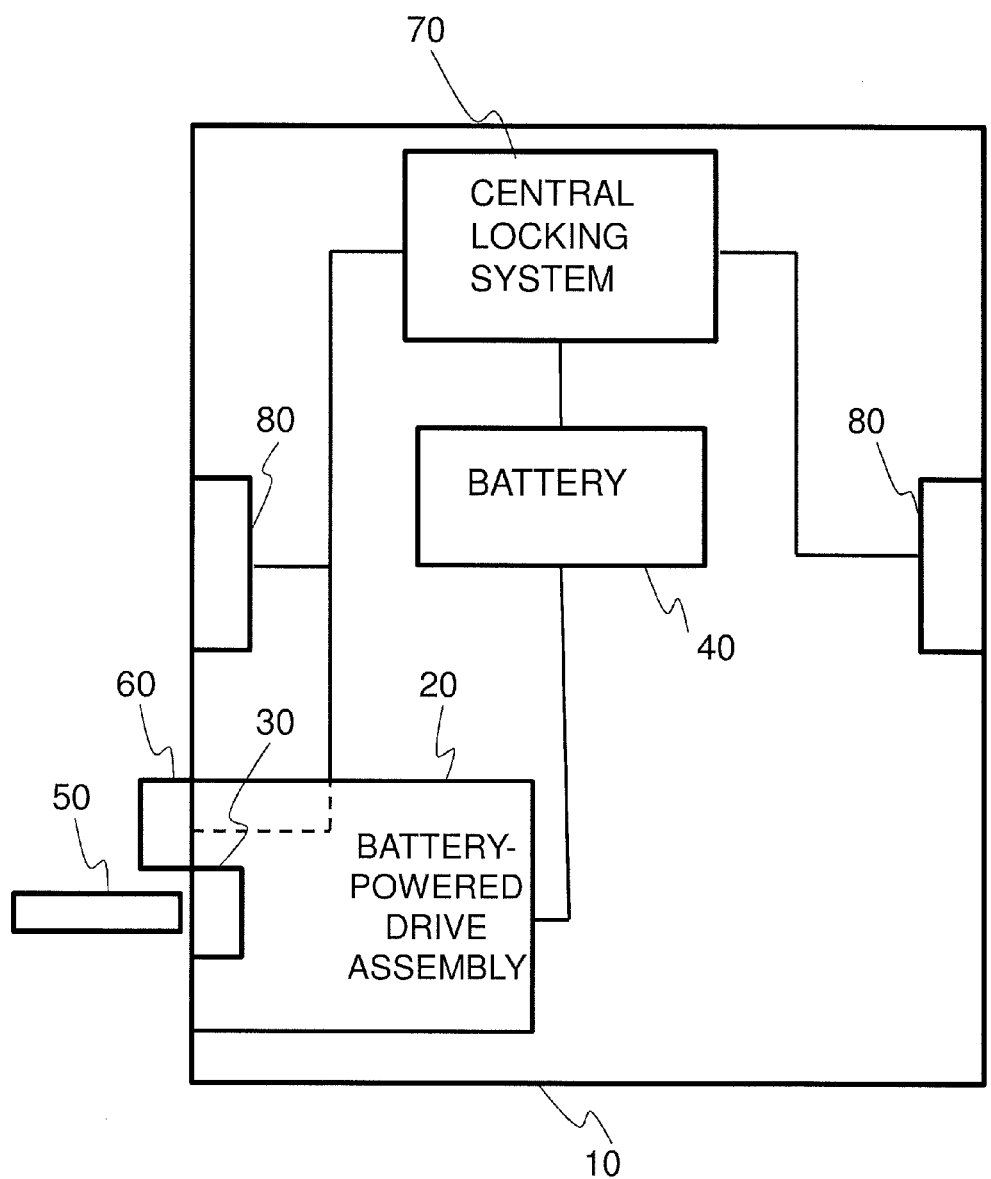

VEHICLE HAVING A BATTERY-POWERED DRIVE ASSEMBLY WITH A CENTRAL LOCKING SYSTEM

CROSS REFERENCE TO RELATED APPLICATIONS

This application is based on and hereby claims priority to International Application No. PCT/EP2012/005115 filed on Dec. 12, 2012 and German Application No. 10 2011 122 216.6 filed on Dec. 24, 2011, the contents of which are hereby incorporated by reference.

BACKGROUND

The invention relates to a vehicle having a battery-powered drive assembly having a charging socket which is connected to the battery and which serves for receiving a charging plug connected to a power source, and having a flap for closing the charging socket, wherein the flap can be locked and unlocked by the central locking system of the vehicle.

Vehicles of the generic type are being developed ever further and are increasing in relevance. For the recharging of the battery, said vehicles are normally equipped with a charging socket which is arranged behind a pivotable flap. For the recharging of the battery, the flap is opened, and a charging plug which is connected to a power source is inserted into the charging socket.

Since the charging process takes a relatively long time, it is necessary to lock the vehicle, for which purpose, in most vehicles, a central locking system is provided. In many cases, the connection between the charging plug and the charging socket is also secured, such that the charging plug cannot be pulled out by unauthorized persons.

After the end of the charging process, the charging plug must be pulled out and the flap closed. Since the vehicle is locked, however, the flap cannot be moved into its closed position without prior actuation of the central locking system. The reason for this is that, when the vehicle is locked, the locking element for the flap is situated in its blocking position. Therefore, before the flap is closed, the vehicle must initially be unlocked by the central locking system, and after the flap has been closed, the vehicle must be locked again by another actuation of the central locking system (by a key, a remote control or for example an actuation of a handle in the case of keyless entry systems).

SUMMARY

One possible object relates to reducing the effort required for closing only the flap, and thus improving the ease of operation of an electric vehicle.

The inventor proposes that, when the charging plug is removed from the charging socket in the event of the vehicle having been locked by the central locking system, the central locking system unlocks at least the flap for a predefined period of time, such that the flap can be moved into its lockable closed position before automatic locking takes place after the predefined period of time has elapsed. In this way, the user of the vehicle can pull out the charging plug and close the flap without having to think about the procedures for locking the flap. After the flap has been closed, the vehicle is automatically locked again.

BRIEF DESCRIPTION OF THE DRAWINGS

These and other objects and advantages of the present invention will become more apparent and more readily appreciated from the following description of the preferred embodiments, taken in conjunction with the accompanying drawings of which:

FIG. 1 shows a vehicle according to an embodiment of the disclosure.

DETAILED DESCRIPTION OF THE PREFERRED EMBODIMENT

Reference will now be made in detail to the preferred embodiments of the present invention and FIG. 1.

Reference will be made to vehicle 10 shown in FIG. 1, where vehicle 10 includes a battery-powered drive assembly 20 having a charging socket 30 which is connected to the battery 40 and which serves for receiving a charging plug 50 connected to a power source (not shown), and having a flap 60 for closing the charging socket 30, wherein the flap 60 may be locked and unlocked by the central locking system 70 of the vehicle 10. To implement the proposals, it is merely necessary for the removal of the charging plug 50 from the charging socket 30 to be identified, for example by a corresponding contact, and for the central locking system 70 to then be actuated such that it switches to "unlocked" for a predefined short period of time. If the central locking system 70 is constructed such that the flap 60 is actuated independently of the doors 80, the tailgate and other devices, then it is self-evidently sufficient for only the flap 60 to be unlocked for a predefined short period of time. In the same way, it is possible for the entire central locking system 70 to unlock all of the doors 80 and flaps 60 for a short period of time upon the removal of the charging plug 50. This is not a disadvantage because the vehicle is indeed under supervision.

Sensing of the charging plug is 50 already provided in some cases. When the charging plug 50 is pulled out (message is already present on vehicle CAN bus), the lock of the flap 60 can be temporarily opened in a simple manner by the control unit of the central locking system 70. The proposals can thus be implemented in a particularly inexpensive manner.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide* v. *DIRECTV*, 69 USPQ2d 1865 (Fed. Cir. 2004).

The invention claimed is:

1. A vehicle comprising:
   a battery
   a battery-powered drive assembly;
   a charging socket which is connected to the battery and which is configured to receive a charging plug connected to a power source, the vehicle being configured to detect removal of the charging plug from the charging socket;
   a flap to open and close for accessing the charging socket; and
   a central locking system to lock and unlock at least one part of the vehicle and to lock and unlock the flap such that, if at least the flap was locked by the central locking system with the charging plug being received in the charging socket and the flap being in an open position, the central locking system is actuated to unlock at least the flap for a predefined period of time in response to the charging plug having been detected as being removed from the charging socket, such that the flap is movable into a lockable closed position before automatic locking takes place after the predefined time period has elapsed.

2. The vehicle as claimed in claim 1, wherein
the flap is locked and unlocked with a locking element,
the locking element is situated in a blocking position when the flap is locked, and
if the at least one part of the vehicle is locked by the central locking system with the charging plug being received in the charging socket, the central locking system locks both the at least one part and the flap, the flap being locked by the locking element being moved to the blocking position.

3. The vehicle as claimed in claim 1, wherein if the at least one part of the vehicle was locked by the central locking system with the charging plug being received in the charging socket, the central locking system locks both the at least one part and the flap.

4. The vehicle as claimed in claim 3, wherein after detecting removal of the charging plug from the charging socket, the central locking system unlocks only the flap for the predefined period of time.

5. The vehicle as claimed in claim 1, wherein after detecting removal of the charging plug from the charging socket, the central locking system unlocks only the flap for the predefined period of time.

6. The vehicle as claimed in claim 1, wherein after detecting removal of the charging plug from the charging socket, the central locking system unlocks both the flap and doors of the vehicle for the predefined period of time.

7. A method for closing a charging socket of a motor vehicle having a battery and a battery-powered drive assembly, the charging socket being connected to the battery, the method comprising:
receiving a charging plug connected to a power source, the charging plug being received in the charging socket;
identifying by the motor vehicle, removal of the charging plug from the charging socket; and
using a central locking system of the motor vehicle to lock and unlock a flap of the motor vehicle for opening and closing the flap to access the charging socket such that if at least the flap was locked by the central locking system with the charging plug being received in the charging socket and the flap being in an open position, the central locking system is actuated to unlock at least the flap for a predefined period of time in response to identifying removal of the charging plug from the charging socket, such that the flap is moveable into a lockable closed position before automatic locking takes place after the predefined time period has elapsed.

8. The method as claimed in claim 7, wherein
the flap is locked and unlocked with a locking element,
the locking element is situated in a blocking position when the flap is locked, and
if a part of the vehicle other than the flap is locked by the central locking system with the charging plug being received in the charging socket, the central locking system locks both the part and the flap, the flap being locked by the locking element being moved to the blocking position.

9. The method as claimed in claim 7, wherein if a part of the vehicle other than the flap was locked by the central locking system with the charging plug being received in the charging socket, the central locking system locks both the part and the flap.

10. The method as claimed in claim 9, wherein after identifying removal of the charging plug from the charging socket, the central locking system unlocks only the flap for the predefined period of time.

11. The method as claimed in claim 7, wherein after identifying removal of the charging plug from the charging socket, the central locking system unlocks only the flap for the predefined period of time.

12. The method as claimed in claim 7, wherein after identifying removal of the charging plug from the charging socket, the central locking system unlocks both the flap and doors of the vehicle for the predefined period of time.

* * * * *